US012608239B1

(12) United States Patent
Venugopal et al.

(10) Patent No.: US 12,608,239 B1
(45) Date of Patent: Apr. 21, 2026

(54) DYNAMIC LATENCY SHAPING TO CONTROL SERVER LOAD

(71) Applicant: Amazon Technologies, Inc., Seattle, WA (US)

(72) Inventors: Sriram Venugopal, Issaquah, WA (US); Andrew Boyer, Berlin (DE); Mark Robinson, Seattle, WA (US); Aravinda Venkatramana, Redmond, WA (US); Harshi Priya Yarragonda, Seattle, WA (US); Abhimanyu Agarwal, Seattle, WA (US); Scott Kirvan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 359 days.

(21) Appl. No.: 18/194,456

(22) Filed: Mar. 31, 2023

(51) Int. Cl.
*G06F 9/44* (2018.01)
*G06F 9/50* (2006.01)
*G06F 11/34* (2006.01)

(52) U.S. Cl.
CPC .......... *G06F 9/5072* (2013.01); *G06F 9/5077* (2013.01); *G06F 11/3409* (2013.01)

(58) Field of Classification Search
CPC ................................................... G06F 9/5072
USPC ......................................................... 718/105
See application file for complete search history.

(56) References Cited

U.S. PATENT DOCUMENTS

| | | | | |
|---|---|---|---|---|
| 8,533,103 | B1 * | 9/2013 | Certain | G06Q 30/06 705/37 |
| 9,304,951 | B1 | 4/2016 | Chatterjee | |
| 10,686,616 | B2 * | 6/2020 | Nguyen | H04L 47/34 |
| 11,442,630 | B1 | 9/2022 | Olson et al. | |
| 12,210,748 | B1 | 1/2025 | Robinson et al. | |
| 2004/0193397 | A1 | 9/2004 | Lumb et al. | |
| 2014/0047079 | A1 * | 2/2014 | Breternitz | G06F 9/5072 709/220 |
| 2018/0173464 | A1 | 6/2018 | Wongso | |
| 2019/0332319 | A1 | 10/2019 | Martin et al. | |
| 2019/0334801 | A1 | 10/2019 | Dutta et al. | |
| 2019/0394273 | A1 | 12/2019 | Basak | |

(Continued)

OTHER PUBLICATIONS

Cheng et al., Network performance isolation for latency-sensitive cloud applications, Future Generation Computer Systems 29 (2013) 1073-1084.

(Continued)

*Primary Examiner* — Timothy A Mudrick
(74) *Attorney, Agent, or Firm* — Knobbe, Martens, Olson & Bear, LLP

(57) ABSTRACT

Systems and methods are provided for controlling load on a server hosting block storage volumes by dynamically controlling latency for input/output (I/O) operations to the block storage volumes. The system can selectively inject synthetic latency into the I/O operations according to how the server is loaded, thus enabling control of server load. For example, when the server is overloaded, additional synthetic latency can be injected into I/O operations to counteract overloading. This synthetic latency can then be removed when the server is no longer overloaded. Modifications of synthetic latency can be targeted to individual clients, individual types of I/O operations, or both, facilitating targeted performance shaping for servers hosting block storage volumes.

20 Claims, 5 Drawing Sheets

(56)     References Cited

U.S. PATENT DOCUMENTS

2020/0050395 A1     2/2020   Bavishi et al.
2020/0125260 A1     4/2020   Pasupathy
2021/0064286 A1     3/2021   Jung

OTHER PUBLICATIONS

U.S. Appl. No. 11/442,630, filed Sep. 29, 2020, Olson et al.

* cited by examiner

DYNAMIC LATENCY SHAPING TO CONTROL SERVER LOAD

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual storage drives (sometimes referred to as "hard drives," "disk drives," or the like) for compute resources, object storage services that act as network-accessible data stores, and the like. A cloud service provider may manage the underlying hardware supporting such services, such that an end user need not do so. For example, a cloud service provider may use a variety of hardware of different revisions or manufacturers, and may update or alter that hardware periodically. The cloud service provider can also provide for the specifics of interconnecting that hardware, including building devices, internetworking those devices, etc. These changes are typically opaque to the end user, relieving the end user of dealing with issues such as hardware compatibility, networking configuration of physical devices, and the like. Cloud computing can thus significantly simplify development and deployment of computing processes.

DETAILED DESCRIPTION

Figure 1:
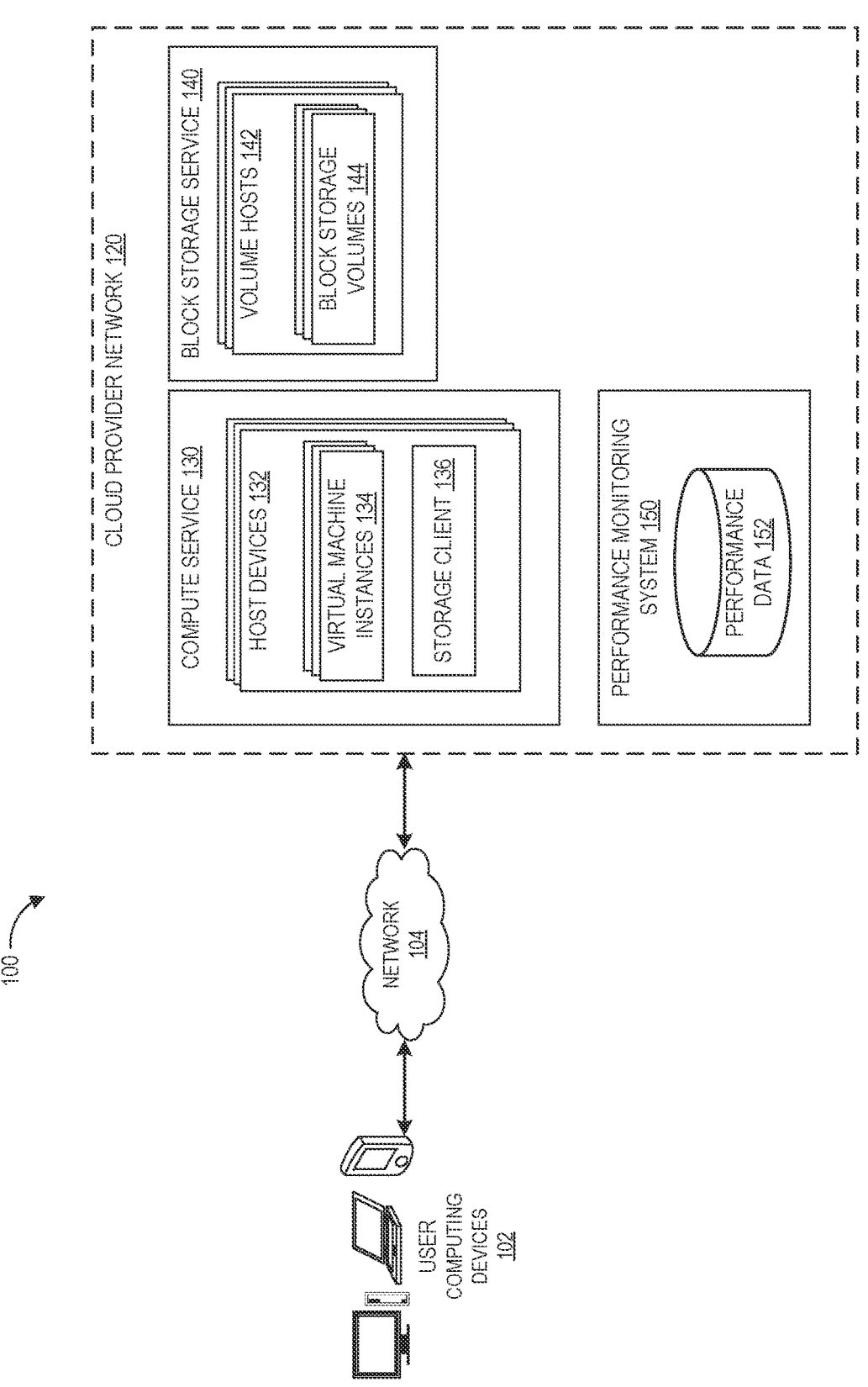
FIG. 1 depicts a schematic diagram of a cloud provider network in which various embodiments according to the present disclosure can be implemented to provide for server load management.

Generally described, aspects of the present disclosure relate to providing load management of servers associated with block-storage volumes in cloud computing environments. A block storage volume can generally correspond to a network resource that acts as a virtualized storage drive for a computing instance, such as a virtual machine (VM) instance, enabling the VM instance to read from and write to the volume as if the volume were physically coupled to it. In some scenarios, servers hosting block storage volumes may be intelligently overprovisioned based for example on analysis of historical usage data for the volumes hosted on the server, such that the server may be unable to provide full performance to all volumes hosted on the server simultaneously. For example, the cloud provider may offer a category of volumes that customers can choose to use for a discounted cost in exchange for allowing overprovisioning. Overprovisioning can significantly improve efficiency, as provisioning servers to support simultaneous full performance typically requires greatly increased resources. Moreover, as simultaneous full performance is rarely required in practice, particularly when historical patterns are used as a basis for volume co-placement, overprovisioning can have little performance impact under most circumstances. Nevertheless, even using intelligent placement, it is still possible that situations may occur in which the load on a block storage server could exceed a capacity of the server.

Many techniques for addressing such scenarios can in fact exacerbate the problem in the short term. For example, migrating a volume away from a server in an attempt to reduce load on the server can require resources of the server, further increasing load. Similarly, declining input/output (I/O) operations when under load can result in multiple round-trip communications between a server and an instance (e.g., due to the instance retrying the operation), also increasing load. Accordingly, according to existing techniques, it may be difficult to deal with an overloaded block storage server without exacerbating overloading. Embodiments of the present disclosure provide a solution to this problem, among others, by providing for dynamic addition of synthetic latency to I/O operations between instances and their corresponding block storage servers. Specifically, by injecting synthetic latency into I/O operations sent to a block storage server, a rate of operations handled by the server can be reduced, thus reducing load on the server. This latency may be added on the VM instance host, for example at an IO client that virtualizes the storage volume for the VM instance, based on a signal that the corresponding block storage server is approaching some threshold of its load capacity. As discussed herein, the use of synthetic latency injection to reduce server load beneficially avoids further increased use of server resources, thus avoiding exacerbation of load as in other techniques. Moreover, embodiments of the present disclosure can be particularly beneficial in handling short-term overloading, such as that caused by temporarily simultaneous high usage in overprovisioned environments.

As disclosed herein, a cloud computing environment can provide both compute and storage resources that end users of the environment may utilize to conduct computing operations. For various reasons, such as increases in efficiency and resiliency, the cloud computing environment may logically separate compute and storage resources. For example, compute resources may be provided in the form of instances-either virtual or physical-providing computational processing capabilities. While instances may have limited amounts of local physical persistent storage, they may operate primarily based on network-accessible persistent storage. In the context of the present disclosure, such storage can include a network-accessible block storage volume. The block storage volume is illustratively hosted on a host device (a "volume host") that is in networked communication with the instances. In one embodiment, the volume is locally addressable by the instances, even while the volume is not physically local to the instance. For example, each instance may include hardware or software (referred to herein generally as a "storage client") that accepts I/O operations to the volume via a local mass storage protocol, such as Serial ATA ("SATA") and translates the operations into network communications to a remote, network-attached volume host hosting the volume. The client may further obtain responses from the volume host, translate the responses appropriately, and return the translated responses to the instance. Thus, an instance may appear to operate in a manner similar to a local physical machine (e.g., with a local mass storage volume), but in reality be implemented by distinct cloud services providing compute and storage capabilities.

As noted above, volume hosts may host multiple volumes and may be overprovisioned, such that the volume host cannot support full usage (e.g., a maximum specified performance) of all volumes simultaneously. Rather, each volume host may be provisioned with resources such that they may support a given expected aggregate usage without becoming overloaded (e.g., the maximum aggregate usage expected in some percentage of cases, such as 99.999% of the time, or other sufficiently high number such that overloading is expected to be incredible rare, if it even occurs at all). Nevertheless, in instances where aggregate usage exceeds this level, a volume host may become overloaded. In this context, overloading can generally refer to resource usage exceeding a maximum threshold. For example, a host may become overloaded when resource usage exceeds 70%, 80%, 90%, etc., of an expected maximum, which the maximum may be derived for example due to a physical configuration of the host (e.g., a maximum processor speed or memory amount) or empirical measurement (e.g., an empirically derived maximum number of I/O operations per second, maximum read or write bandwidth, etc.). Overloading can cause degradation of performance and is often preferable to avoid.

While various techniques exist for addressing overloaded volume hosts, these techniques are often problematic, particularly for intermittent overloading. For example, a cloud provider may attempt to address overloading by migrating a block storage volume (e.g., a heavily used volume) from an overloaded server to a new volume host with more capacity to handle I/O operations. Such migration, however, requires bandwidth and time to complete, thus exacerbating overloading. Moreover, performance of the volume may suffer during migration. As another example, an overloaded volume host may attempt to reduce load by declining to process I/O operations, such as by sending an error message in response to an operation. This approach may cause the instance to retry the operation, resulting in further load on the volume host and again exacerbating overloading. Accordingly, these approaches can be insufficient to handle overloading, particularly in the short term.

Furthermore, migration of block storage volumes to a new volume host, or returning error messages to instances, may not resolve issues relating to excessive I/O operations by one or more instances. As an illustration, while it may be permissible to use all specified resources of a volume, one or more instances may tend to use such resources in a pattern that causes overloading (e.g., in a manner different than that expected when projecting load on a volume host). These instances may thus tend to act as "noisy neighbors," utilizing outsized resources of any volume host to which their volume is migrated. Accordingly, even in the face of migration or errors, such instances may continue to cause overloading.

Embodiments of the present disclosure address these problems by enabling dynamic synthetic latency shaping of I/O operations to counteract overloading of volume hosts in cloud computing environments. Specifically, as disclosed herein, a cloud provider may counteract overloading by adding synthetic latency to I/O operations associated with a volume host when the volume host is overloaded. Such added latency can reduce a level of I/O operations, thereby counteracting overloading and returning the load of the volume host to a desired level. Beneficially, the techniques described herein therefore address overloading without exacerbating loading of a volume host.

More specifically, each volume as disclosed herein may be associated with a performance profile that at least partly controls the addition of synthetic latency to I/O operations of the volume. As used herein, the term "synthetic latency" is intended to refer generally to latency other than that otherwise required to complete an I/O operation. For example, the time required to send an I/O operation to a volume host, process the operation, and return a result may form "actual latency." In many instances, the actual latency for a volume may have significant variance, or may be lower than is required or expected for a volume. Thus, an instance or a volume host may inject synthetic latency into one or more I/O operations, smoothing average performance of such operations and enabling performance to more closely match requirements or expectations. Various mechanisms for injection of synthetic latency via performance profiles are described in U.S. Pat. No. 11,442,630, entitled "DELAYING RESULT OF I/O OPERATION BASED ON TARGET COMPLETION TIME" and issued Sep. 13, 2022 (the "'630 Patent"), and U.S. patent application Ser. No. 18/067,646, entitled "PROVIDING CONSISTENT PERFORMANCE OF BLOCK-STORAGE VOLUMES IN CLOUD COMPUTING ENVIRONMENTS" and filed Dec. 12, 2022 (the "'646 Application") (the '630 Patent and the '646 Application being collectively referred to as the "Prior Filings"), the entireties of which are incorporated by reference herein.

As disclosed herein, in addition or alternatively to benefits noted in the Prior Filings, synthetic latency may be used to counteract overloading on volume hosts. More specifically, a performance monitoring system is disclosed herein that can identify when a volume host is overloaded, and that can in response modify performance profiles associated with volumes hosted on the volume host to increase an amount of synthetic latency added for I/O operations of such volumes.

This addition of synthetic latency into I/O operations can, in turn, slow a frequency of operations submitted to the volume host, as subsequent I/O operations often depend on results of prior I/O operations. As a result of this reduced frequency, load on the volume host may be reduced, counteracting any overloading. Notably, this technique for addressing overloading avoids drawbacks of prior techniques, insomuch as increases in synthetic latency to I/O operations do not increase load on the volume host.

In many cases, load on a volume host can be measured in multiple dimensions, any of which can cause overloading in that dimension. For example, a server acting as a volume host may have distinct capacities for handling read operations and write operations. Illustratively, the server may be able to handle x write operations and y read operations, where x and y are not the same value and may be at least partially independent. Moreover, such a server may have distinct capacities with respect to I/O operations per second (IOPS) and throughput (e.g., as a total volume of data in I/O operations). These two capacities may be used in varying amounts due to the specific I/O operations handled. For example, small write operations (e.g., corresponding to block sizes under a given threshold) may tend to have more impact on IOPS load than throughput. Conversely, large write operations may tend to have more impact on through-put than IOPS load. Accordingly, it may be possible to address overloading of a volume host by specifically targeting those operations that are causing such overloading.

In some embodiments, therefore, a performance monitoring system as disclosed herein may address overloading on a volume host by the addition of synthetic latency to a subset of I/O operations selected according to a dimension on which the server is overloaded (or "bound"). For example, the performance monitoring system may determine that write I/O operations of VM instances are taking up a majority of server and/or block storage volume utilization versus read I/O operations, and therefore, the performance monitoring system may modify existing dynamic performance profiles of VM instances to increase synthetic latency on write I/O operations but leave the latency setting for read I/O operations unchanged. Similar determination made be made for other dimensions, for example, determining whether the number of I/O operations (IOPS) and/or the size of each I/O operation (throughput) may be contributing and/or causing overloading and then modifying dynamic performance profiles accordingly.

Moreover, the performance monitoring system may in some instances control the addition of synthetic latency to only a subset of volumes hosted by an instance. For example, the performance monitoring system may determine that I/O operations at a subset of volumes are making up the majority or plurality of utilization of a volume host (e.g., 5% of all volumes are causing 68% utilization of a CPU of a volume host). Based on this determination, the performance monitoring system may modify existing performance profiles of these volumes to increase their synthetic latency, while leaving synthetic latency unchanged on remaining volumes. This can enable the performance monitoring system to address "noisy neighbors" and achieve a more even distribution of resource utilization among volumes on a given host, for example by reducing a "peak to mean" distance, as measured between resource usage of a most heavily loaded volume and the average volume on a volume host.

In some instances, increases in synthetic latency may occur iteratively. For example, the performance monitoring system may maintain multiple load thresholds, such that minor increases of synthetic latency occur at a first threshold and more substantial increases occur at later thresholds. This can enable a gradual approach that avoids jarring changes to performance of a volume. Similarly, the performance monitoring system may roll-back increases as load reduces below such thresholds, such as by reverting changes made at that threshold. Accordingly, the techniques described herein can be used to avoid overloading without significant apparent impact on end user performance relative to that which might otherwise occur due to overloading, while both avoiding such overloading and avoiding increases to volume host resource usage that might occur under alternative techniques to address overloading.

As will be appreciated by one of skill in the art in light of the present disclosure, the embodiments disclosed herein improve the ability of computing systems, such as cloud computing systems providing block storage volumes, to implement such volumes in a manner such that the servers and/or volume hosts associated with them do not become overloaded. Moreover, the presently disclosed embodiments address technical problems inherent within computing systems; specifically, the inherent limitations of computing resources used to host storage volumes and the inherent use of such resources required to implement other techniques to address overloading. These technical problems are addressed by the various technical solutions described herein, including the use of synthetic latency increases to counteract overloading on a volume host. Thus, the present disclosure represents an improvement on computing systems providing block storage volumes and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented. The cloud provider network 120 can be accessed by user computing devices 102 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes a compute service 130, block storage service 140, and performance monitoring system 150 that are in networked communication with one another and with the network 104 to provide users with on-demand access to computing resources including virtual machine instances 134 and block storage volumes 144, among others. These particular resources are described in further detail below. Some implementations of cloud provider network 120 can additionally include domain name services ("DNS") services, object storage services, relational database services, and other service configurations (not illustrated) for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces (GUIs), command line interfaces (CLIs), application programming interfaces (APIs)) enabling end users, via user computing devices 102, to access and configure resources provided by the various services.

The cloud provider network 120 can provide on-demand, scalable computing platforms to users through the network 104, for example allowing users to have at their disposal scalable "virtual computing devices" via their use of the compute service 130 and block storage service 140. These virtual computing devices have attributes of a personal computing device including hardware (e.g., various types of processors, local memory, random access memory ("RAM"), hard-disk and/or solid state drive ("SSD") storage, etc.), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

Turning specifically to the roles of the different services within the cloud provider network 120, the compute service 130 include one or more host devices 132 (e.g., a compute host) on which provide resizable computing capacity to users for building and hosting their software systems. The host devices 132 and associated control plane functionality can provide an elastic compute cloud service of the cloud provider network. Compute services can be referred to as a virtual compute service, or cloud compute service, in various implementations. Users can use the host devices 132 to launch as many virtual machine instances 134 referred to as virtual computing environments, virtual compute instances, virtual machines, or "instances," as they need. While FIG. 1 depicts host devices 132 as including VM instances 134, in some instances the compute service 130 may enable an end user to directly access a host device 132 as a "bare metal" compute instance, providing access to the device 132 without virtualization.

Instances 134 can have various configurations of processing power, memory, storage, and networking capacity depending upon user needs. The host devices 132 can also include computer storage for temporary data used while an instance is running, however this storage may be limited. For example, the storage may be ephemeral, meaning that data stored in the storage is lost as soon as the instance is shut down this data is lost. To provide access to additional storage, each host device 132 can illustratively include a storage client 136 that enables access to the block storage service 140. As discussed below, the block storage service 140 can operate to provide virtualized storage drives to instances 134 in the form of block storage volumes 144. The storage client 136 may enable instances 134 to interact with such volumes 144, such as by accepting I/O requests from instances 134 according to a local mass storage protocol (e.g., SATA, SCSI, etc.) and converting such I/O requests to network communications with the block storage service 140. The storage client 136 may further handle other aspects of use of a block storage volume 144, such as authenticating the block storage service 140, initializing a connection to the volume 144, and the like. The process of a client 136 initializing a connection to a volume 144 and making the volume available to an instance 134 may be referred to as "attachment," as the volume 144 can after such process become available to the instance 134 in a manner similar to physically attaching a disk drive to a computing device.

In one embodiment, the storage client 136 is implemented as software executing on host devices 132, such as code executed within a hypervisor operating system that hosts the virtual machine instances 134. In another embodiment, the storage client 136 is implemented within an isolated hardware environment, such as an "offload" card physically present within host devices 132 that presents to the host devices 132 as one or more storage devices. Such an offload card of the host devices 132 can include one or more CPUs that are not available to instances 134, but rather are dedicated to instance management tasks such as virtual machine management, input/output virtualization to network-attached storage volumes, local migration management tasks, instance health monitoring, and the like. Use of a hardware offload card may, for example, enable greater use of a main processor of a host device 132 by instances 134, ensure further security to communications between the instances 134 and the volumes 144, and enable use of block storage volumes 144 as virtualized disk drives for "bare metal" instances implemented on host devices 132 without virtualization.

The block storage service 140 can provide persistent data storage for the instances 134 in the form of block storage volumes 144, each of which represents a virtualized, network-accessible block-storage device (e.g., a virtual "hard disk"). The block storage volumes 144 may be hosted by volume hosts 142 (e.g., a storage host), which correspond to servers configured to provide access to block storage volume 144 (e.g., by receiving I/O operations to block storage volumes 144, processing such operations, and returning results). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." Data of volumes 144 may be stored in the form of blocks on physical storage media of volume hosts 142, which physical storage media may include any number of known nonvolatile storage media, including magnetic disk drives, solid state memories, and the like. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 KB, 8 KB, 16 kB, 32 KB, 64 kB, 128 KB, 256 kB, 512 KB, or larger, depending upon the implementation. In accordance with embodiments of the present disclosure, the specific hardware of storage media can be heterogenous, encompassing media of different types, manufacturers, revisions, production runs, and the like, and a consistent performance for a volume 144 can be achieved by associating the volume 144 with a performance profile. Each volume 144 is illustratively hosted by one or more storage media on volume hosts 142 that are associated with performance meeting or exceeding the performance profile of the volume 144.

User volumes 144, which can be treated as an individual drive ranging for example from 1 GB to 1 terabyte TB (or more) in size, are made of one or more blocks stored on the block storage service 140. Although treated as an individual drive, it will be appreciated that a volume 144 may be stored as one or more virtualized devices implemented on one or more underlying storage media. Volumes 144 may be partitioned a small number of times (e.g., up to 16) with each partition stored on a distinct volume host 142 of the cloud provider network 120 that has the ability to transfer data at around 1 GB per second ("Gbps") in some implementations. These volumes provided persistent, dedicated storage that can be attached to particular instances 134 of the compute service 130. Each volume 144 may be "attached" to an instance 134 running on a compute service 130, and can be detached from that instance 134 and re-attached to another. As noted above, attachment between a volume and an instance can refer to the establishment of a connection between a storage client 136 associated with the instance 134 and the volume 144. This connection may be referred to as a "lease" in some implementations, and can enable to instance 134 to view the volume 144 as if it were a local storage drive, even though the volume 144 and instance 134 may be hosted on different physical machines and communicating over a network. The block storage service 140 may have built-in redundancy for volumes by replicating the volume across multiple storage media, such as media of different volume hosts 142 within an availability zone, which means that volumes will not fail if an individual drive fails, an individual volume host 142 fails, or some other single failure occurs.

While not shown in FIG. 1, the block storage service 140 may include one or more servers to facilitate interaction between storage clients 136 and volume hosts 142. One example configuration of a block storage service 140 is shown, for example, in U.S. Pat. No. 11,494,108, entitled "CROSS-ZONE REPLICATED BLOCK STORAGE DEVICES" and issued Nov. 8, 2022, the entirety of which is incorporated by reference herein. Moreover, while shown in FIG. 1 as distinct, the compute service 130 and block storage service 140 may in some instances be implemented utilizing a single set of computing devices. For example, a single set of servers may be used to implement both the compute service 130 and block storage service 140.

In the example of FIG. 1, each block storage volume 144 may be associated with an expected performance, which may be characterized in one or more performance dimensions. For example, a volume 144 may be expected to support a given level of read operations and a given level of write operations, characterized in terms of IOPS, throughput, or the like. In some instances, expected performance may further define statistical measures of individual operations, such as an average latency of a given operation. The expected performance may correspond for example to an average performance, minimum performance, maximum performance, etc.

As noted above, volume hosts 142 may be overprovisioned, such that a given volume host 142 has insufficient resources to simultaneously process I/O operations to all volumes 144 hosted on that volume host at the full expected performance of that volume. Because most volumes 144 would not be expected to utilize full performance at any given time, such overprovisioning can significantly increase the efficiency of the block storage service 140. However, should a significant number of volumes 144 request above-average performance, overprovisioning can result in a volume host 142 becoming overloaded, degrading performance and in some cases causing errors on the service 140 or instances 134.

In accordance with embodiments of the present disclosure, the cloud provider network 120 includes a performance monitoring system 150 configured to address overloading on a volume host 142 by increasing synthetic latency added to at least some I/O operations on at least some volumes 144 hosted by the volume host 142. Specifically, as disclosed herein, the performance monitoring system 150 may obtain volume performance information from individual host devices 132, individual volume hosts 142, or both, to detect when load on a volume host 142 exceeds a threshold level. The performance information is illustratively stored in a performance data store 152. In response to detecting that load on a volume host 142 exceeds a threshold level, the performance monitoring system 150 can instruct individual host devices 132, the volume host 142, or both, to increase an amount of synthetic latency added to I/O operations of volumes hosted by the volume host 142, thus reducing load on the host 142. The performance monitoring system 150 can further monitor for subsequent changes in load on the host 142 and adjust synthetic latency accordingly (e.g., by increasing synthetic latency if further thresholds are exceeded and decreasing synthetic latency if load falls below such thresholds). As described in more detail below, increases to synthetic latency may in some instances be targeted, such that the increases apply only to a subset of I/O operations or a subset of volumes expected to be causing excessive load on the volume host 142.

As noted above, the Prior Filings described various techniques for injection of synthetic latency via performance profiles. For example, the '630 Patent describes use of a performance profile representing a desired performance for a volume. Thus, increasing synthetic latency for I/O operations for the volume may include modifying the distribution of such a performance profile to shape the distribution such that latency of individual operations is increased (e.g., shifting the distribution to include a higher latency range). The '646 Application describes the use of a proportional-integral-derivative (PID) algorithm to add synthetic latency to I/O operations for the volume according to a target value. Thus, increasing synthetic latency for I/O operations for the volume may include altering the target value for the I/O operations, altering other parameters of the PID algorithm, or the like.

While shown as a distinct element of the network 120, the system 150 may in some instances be implemented using, for example, the compute service 130 and block storage service 140.

As noted above, an individual block storage volume 144 may be partitioned, with partitions of the volume 144 stored across multiple volume hosts 142. Thus, description of a volume 144 hosted on a host 142 should be understood to refer to a volume 144 at least partially hosted on the host 142 (e.g., with at least one partition of the volume 144 so hosted). In some instances, overloading of a volume host 142 hosting a volume 144 may result in an increase in synthetic latency for I/O operations addressed to all partitions of the volume 144. In other instances, overloading of a volume host 142 hosting a volume 144 may result in an increase in synthetic latency for I/O operations for partitions of the volume 144 hosted on the volume host 142.

Moreover, an individual block storage volume 144 may be associated with other block storage volumes 144 as a correlated workload. For example, a single customer of the cloud provider network 120 may be provisioned multiple volumes under one account with similar performance. In other words, the volumes of a correlated workload may be expected to perform consistently amongst each other. As such, if at least one host or partition of a volume of the correlated workload is overloaded, then the performance monitoring system 150 may add synthetic latency to I/O operations of all or some other hosts or partitions of other volumes that are not overloaded in order to maintain consistent performance amongst the volumes of the correlated workload.

Figure 2:
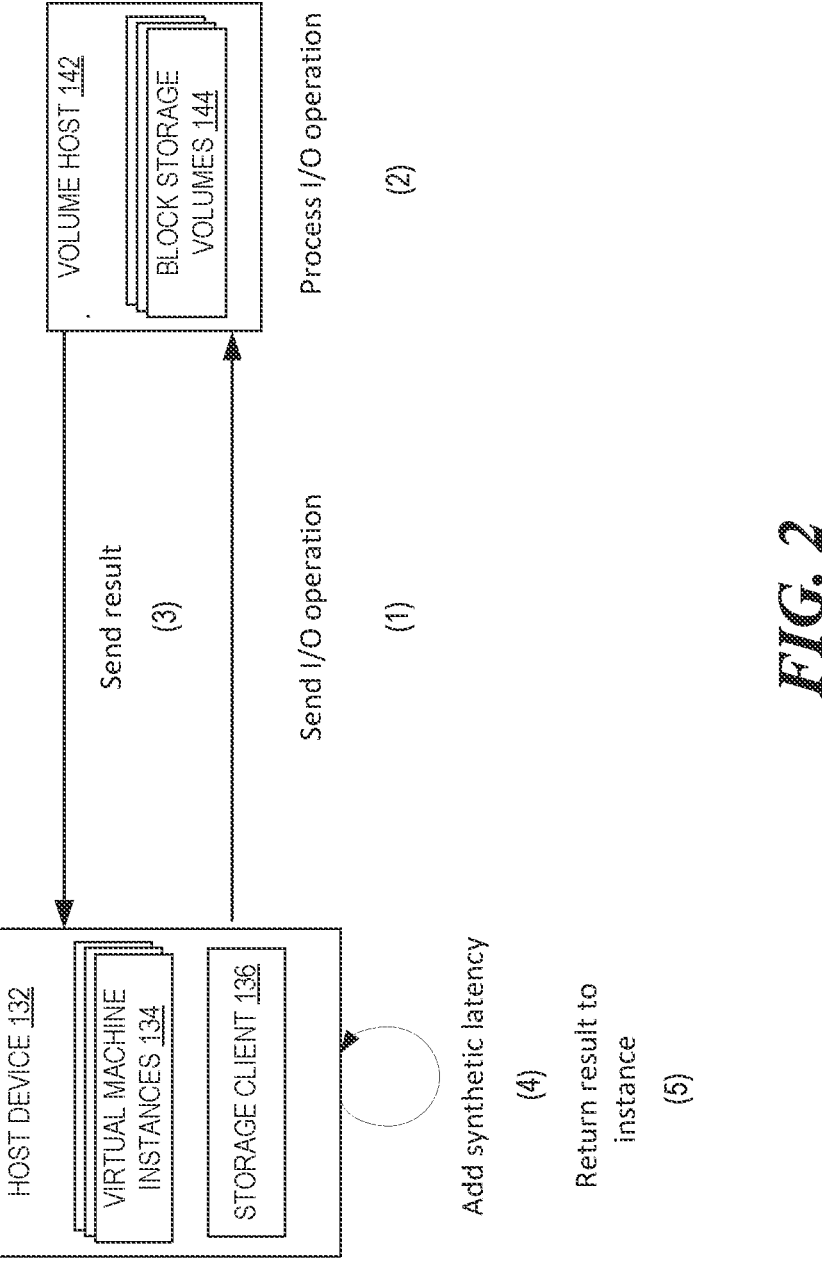
FIG. 2 depicts illustrative interactions for handling an input/output (I/O) operation on a block storage volume, including the addition of synthetic latency to the I/O operation that may be used to control server load according to embodiments of the present disclosure.

To further illustrate the concept of synthetic latency, FIG. 2 provides illustrative interactions for handling an I/O operation on a block storage volume 144. Specifically, FIG. 2 illustrates how an instance 134 may submit an I/O operation on the volume 144 to a volume host 142 hosting the volume 144, and how the volume host 142 processes the I/O operation and provides a result. FIG. 2 further shows how a storage client 136 may delay returning the result to the instance by addition of synthetic latency to the I/O operation (e.g., by holding the result for a period of time corresponding to the synthetic latency). As discussed in more detail below, use of such synthetic latency can facilitate controlling load on the volume host 142.

As shown in FIG. 2 and described in more detail below, the instance 134 submits an I/O operation to a volume host 142 at (1). Illustratively, the I/O operation may originate from an instance 134, and be transformed by a storage client 136 into a network operation that is then submitted from the host device 132 to the volume host 142. The storage client 136 may illustratively act as an intermediary, accepting I/O operations from instances 134 in a local protocol, transforming the operations into corresponding network calls, and submitting the operations to a volume host 142 hosting the instance. For security purposes, the storage client 136 may not have access to the actual content of the I/O operation. For example, I/O operations of instances 134 may be held in memory of the host device 132 and the client 136 may generate a "wrapper" (such as a network header and the like) that is used by the device 132 to encapsulate and submit the I/O operation to the host 142. Thus, the client 126 can facilitate submission of I/O operations to the hosts 142 without inhibiting security of operation of the instances 134.

At (2), the volume host 142 processes the I/O operation. For example, the host 142 may read or write to a volume 144 according to the content of the I/O operation, and generate a result. The host 142 then returns a result of the I/O operation (e.g., a confirmation of a write, contents of data read, etc.) to the host device 132 at (3).

At (4), prior to the instance 134 being informed of the result, the host device 132 adds synthetic latency to the result. In the present context, the addition of synthetic latency (also sometimes called "injection" of synthetic latency) refers to withholding a result, or notification of the result, from an instance 134 for a period of time corresponding to the synthetic latency. For example, where 50 milliseconds of synthetic latency are added, interaction (4) may include holding the result of the I/O operation at the host device 132 for a period of 50 milliseconds before delivering the result to the instance 134, notifying the instance 134 that the result is available, or the like. Addition, in the context of synthetic latency, should thus be understood to refer to delay of the result, rather than modification of the contents of the result.

After the addition of synthetic latency, the host device 132 at (5) returns the result to the instance 134. For example, the device 132 may make data of the result available to the instance 134, notify the instance 134 that such data is available, or the like. Accordingly, from the point of view of the instance 134, the I/O operation has completed.

While FIG. 2 depicts the addition of synthetic latency by a storage client 136 subsequent to obtaining a result, other variations are possible. For example, synthetic latency may be added by other entities, such as by another component of the host device 132, by the volume host 142, or a combination thereof. Moreover, synthetic latency may be additionally or alternatively added prior to submission of the I/O operation to the volume host 142 or prior to processing of the I/O operation at the volume host 142. Thus, it should be understood that synthetic latency may be added at any point between reception of an I/O operation from an instance 134 and returning of a result of such operation to the instance 134.

As discussed above, the amount of synthetic latency added is illustratively controlled by use of a performance profile, such as those described in the Prior Filings. It should be noted that such a performance profile may be updated at any time (real time, or near real time) during the interactions of FIG. 2. Therefore, the actual length of time of when the instance 134 receives the completed I/O operations could be different depending on whether pre-shaping (the addition of synthetic latency prior to processing) or post-shaping (the addition of synthetic latency subsequent to processing) is used. For example, if pre-shaping is used, the synthetic latency may be determined by the storage client 136 using the dynamic performance profile prior to sending the I/O operation requests to the volume host 142. Therefore, if the performance monitoring system 150 modifies the dynamic performance profile (e.g., in the manner described below) after this and sends the storage client 136 the modified dynamic profile, such modifications may not be applied to the I/O operation requests already submitted to the volume host 142 and only applied to new I/O operation requests. As such, if the performance monitoring system 150 attempts to counteract overload on a server associated with volume 144 by increasing latency on some I/O operations of the instance 134, these increases in latency may only be applied to new I/O operation requests due to pre-shaping.

If post-shaping is used, the synthetic latency may be determined by the storage client 136 using the dynamic performance profile after receiving results of I/O operations from the volume host 142. In this case, if the performance monitoring system 150 attempts to counteract overloading on a server associated with the volume 144 by increasing latency on some I/O operations of the instance 134, these increases in latency may be applied to results of I/O operations which storage client 136 has received but not yet provided to the instance 134. In other words, the storage client 136 may receive the results and an update to the dynamic performance profile prior to providing the results to the instance 134. As such, the storage client 136 may use the updated dynamic performance profile to determine synthetic latency and provide the results to the instance 134 when a time associated with the synthetic latency has lapsed. In this case, if the performance monitoring system 150 is counteracting an overloaded volume 144 (e.g., due to excessive write operations, IOPS, throughput, noisy neighbors, etc.) by modifying the dynamic performance profile, such updates may be applied to the results of I/O operations not already provided to the instance 134.

Figure 3:
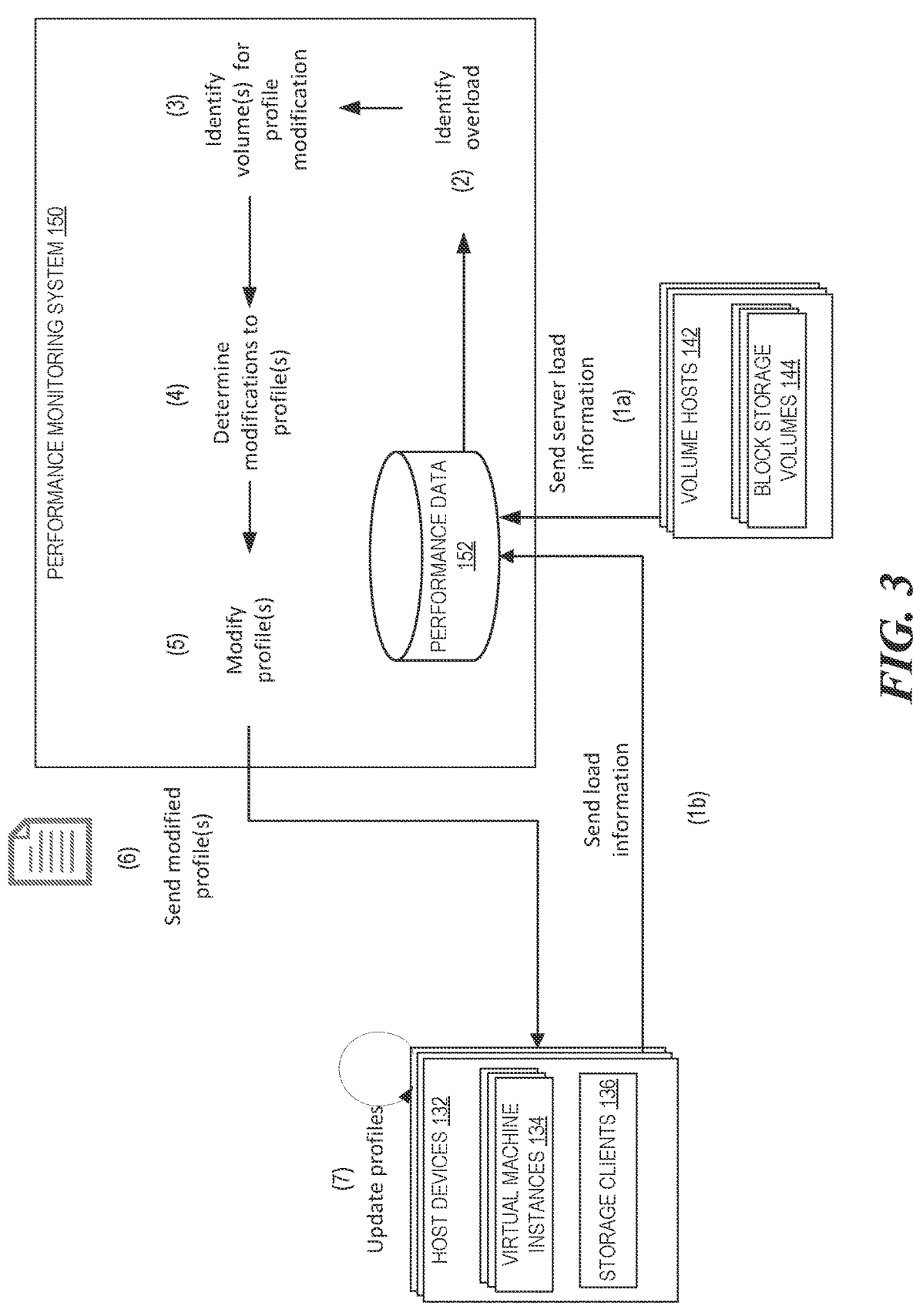
FIG. 3 depicts illustrative interactions for monitoring load at servers of the cloud provider network of FIG. 1 and modifying an amount of synthetic latency added to I/O operations to adjust load at such servers.

With reference to FIG. 3, illustrative interactions are depicted between the instance 134, the storage client 136, the volume 144, and the performance monitoring system 150, to illustrate how the performance monitoring system 150 may monitor load of a volume host 142 and modify an amount of synthetic latency added to I/O operations for volumes hosted by the volume host 142 to counteract overloading of the host 142.

The interactions begin at (la) and (1b), where the performance monitoring system 150 obtains information regarding load on volume hosts 142 from both volume hosts 142 and host devices 132, respectively. The load information may reflect, for example, a number of I/O operations to each volume 144 hosted on a host 142 and information on these operations (such as operation types, block sizes, latencies, etc.). While load information is shown in FIG. 3 as originating from both volume hosts 142 and host devices 132, in some embodiments load information may be obtained from one of these two types of devices (e.g., solely from volume hosts 142 or solely from host devices 132). For example, load information regarding an individual volume host 142 may be obtained from volume hosts 142 directly, or derived from load information obtained from host devices 132, such as by aggregating data on operations sent to any volumes 144 hosted by the volume host 142. In either instance, load information can include any variety of information available at the respective source regarding I/O operations submitted to the hosts 142 or otherwise indicating resource usage of the hosts 142. For example, load information from the volume hosts 142 may include direct metrics of resource usage on the hosts 142 as well as statistical information regarding I/O operations to the hosts 142. The statistical information may include, for example, measurements of load on the host 142 across a number of dimensions (e.g., IOPS, throughput, and network bandwidth for both read and write operations, respectively). In one embodiment, the statistical information is represented as a distribution according to the volumes 144, such that the information identifies when operations on individual volumes 144 are consuming excessive resources relative to other volumes 144. Load information from host devices 132 may similarly include statistical information regarding I/O operations, but might include additional details that may not be available at the volume hosts 142, such as block sizes for I/O operations (which is not recorded at volume hosts 142 in one embodiment). To preserve privacy, the load information can specifically exclude any information regarding the content of I/O operations, and such information may not in any case be available outside of the instance 134. The load information is illustratively stored in the performance data store 152.

At (2), the performance monitoring system 150 utilizes load information of the performance data 152 to determine that a volume host 142 overloaded. For example, the performance monitoring system 150 may compare the load of a volume host 142 to one or more thresholds to determine that the host 142 is overloaded. As noted above, overloading may occur in a variety of dimensions (e.g., read IOPS, write IOPS, read throughput, write throughput, etc.). Thus, the performance monitoring system 150 may identify that a host 142 is overloaded in a given dimension when a load of that host 142 in that dimension exceeds a corresponding threshold for that dimension.

At (3), the performance monitoring system 150 determines the volumes contributing to overload on the volume host 142. As noted above, it can be expected that not all volumes 144 on a given host 142 are contributing equally to load on the host 142. Accordingly, it may not be necessary to increase the synthetic latency of all volumes 144 on the host 142. Rather, the performance monitoring system 150 may identify one or more volumes 144 on which to increase synthetic latency. For example, the performance monitoring system 150 may identify the top n volumes 144 contributing to load on the host 142 (e.g., in the load dimension on which the host 142 satisfied a load threshold), where n may be an absolute number or a percentage. As another example, the performance monitoring system 150 may identify volumes 144 on the host 142 utilizing a greater than expected portion of resources of the host 142 (e.g., in the load dimension on which the host 142 satisfied a load threshold). For example, the performance monitoring system 150 may generate a distribution of resource use of the host 142 in a given dimension, and identify a top portion of the distribution, such as a portion that represents x percentage of the load on the host 142 with respect to a given resource. In this example, the percentage may be based on the amount of overloading. For example, where a host 142 is above a use threshold for a given use dimension by a first percentage, the performance monitoring system 150 may be configured to identify a number of volumes 144 on the host 142 that constitute a second percentage of the use dimension, with the second percentage being equal to or greater than the first percentage, such that injection of synthetic latency into these volumes 144 can be expected to reduce the load on the host 142 below the use threshold. As noted below, the synthetic latency of operations on such volumes 144 can then be increased to control overloading of the volume host 142.

While FIG. 3 depicts identification of individual volumes on which to modify profiles to increase synthetic latency, in some instances the performance monitoring system 150 is configured to increase synthetic latency across all volumes 144 for an overloaded host 142.

Thereafter, at (4), the performance monitory system 150 determines modifications to the performance profiles of volumes 144 on an overloaded host 142 to counteract such overloading. In one example, the modification includes an increase of synthetic latency to the profiles, such that load on the host 142 is reduced due to a lowered frequency of I/O operations. The magnitude of increase may be based, for example, on the magnitude of overloading. For example, each load threshold of a host 142 may be associated with a corresponding increase in synthetic latency, such that the magnitude of added synthetic latency increases as corresponding load thresholds are satisfied.

As noted above, in some instances load on a volume host 142 may be uneven across different load metrics or dimensions. For example, a host 142 may be overloaded with respect to write operations but not with respect to read operations. Similarly, a host 142 may be overloaded with respect to operations in terms of IOPS but not in terms of throughput. Accordingly, the modifications determined at (4) are in some instances specific to a type of I/O operations that are determined to be contributing to overloading. Illustratively, where overloading is being caused by a type of operations (e.g., write operations), modifications may specifically target such operations. Moreover, modifications may target subsets of operations where such operations are determined to significantly contribute to overloaded. For example, where a host 142 is overloaded with respect to IOPS but not throughput (e.g., with respect to writes), the performance monitoring system 150 may modify the synthetic latency to be added to low block size operations (e.g., below a threshold size, such as 16 kilobytes), as such operations would be expected to significantly increase a number of IOPS while having less impact on throughput. Conversely, where a host 142 is overloaded with respect to throughput but not IOPS, the performance monitoring system 150 may modify the synthetic latency to be added to high block size operations (e.g., above a threshold size, such as 16 kilobytes or greater), as such operations would be expected to significantly increase throughput use while having less impact on IOPS. Thus, the modifications determined at (4) may be targeted to specific I/O operations, rather than modifying performance for all I/O operations. Additionally or alternatively, at least one volume of a correlated workload may be overloaded, and therefore, modifications may target all or some other volumes of the correlated workload to maintain consistent performance across the correlated workload.

At (5), the performance monitoring system 150 modifies the dynamic profiles for volumes 144 identified at (3) according to the modifications determined at (4). The performance monitoring system 150 then, at (6), sends the modified dynamic profiles to the host devices 132. The host devices 132, in turn, update the profiles such that subsequent I/O operations for the volumes 144 are modified according to the profiles. Specifically, the host devices 132 can increase synthetic latency for such operations (e.g., as added via the interactions of FIG. 2) such that load on an overloaded volume host 142 is reduced. While FIG. 3 depicts updating of profiles at the host devices 132, profiles may additionally or alternatively be updated at the volume hosts 142, in accordance with the discussion above regarding addition of synthetic latency at hosts 142.

While FIG. 3 is described with respect to an increase in synthetic latency to counteract overloading, similar interactions may be used to reduce synthetic latency in the instance that a host 142 is no longer overloaded. For example, the performance monitoring system 150 may, via the interactions of FIG. 3, determine that load on a host 142 no longer satisfies a threshold and thus revert profiles of volumes 144 on the host to default values (e.g., a default setting). In some instances, the interactions of FIG. 3 may be implemented absent any overloading on a host 142. For example, the performance monitoring system 150 may detect that a host 142 is very lightly loaded (e.g., satisfying a low use threshold) and increase the performance profile of volumes 144 on the host 142, providing increased performance of the volumes 144 during such periods of light load. Moreover, the interactions of FIG. 3 may be iterative, such that the interactions occur continuously or periodically to adjust performance profiles of volumes 144 according to the load on hosts 142 hosting such volumes 144.

Figure 4:
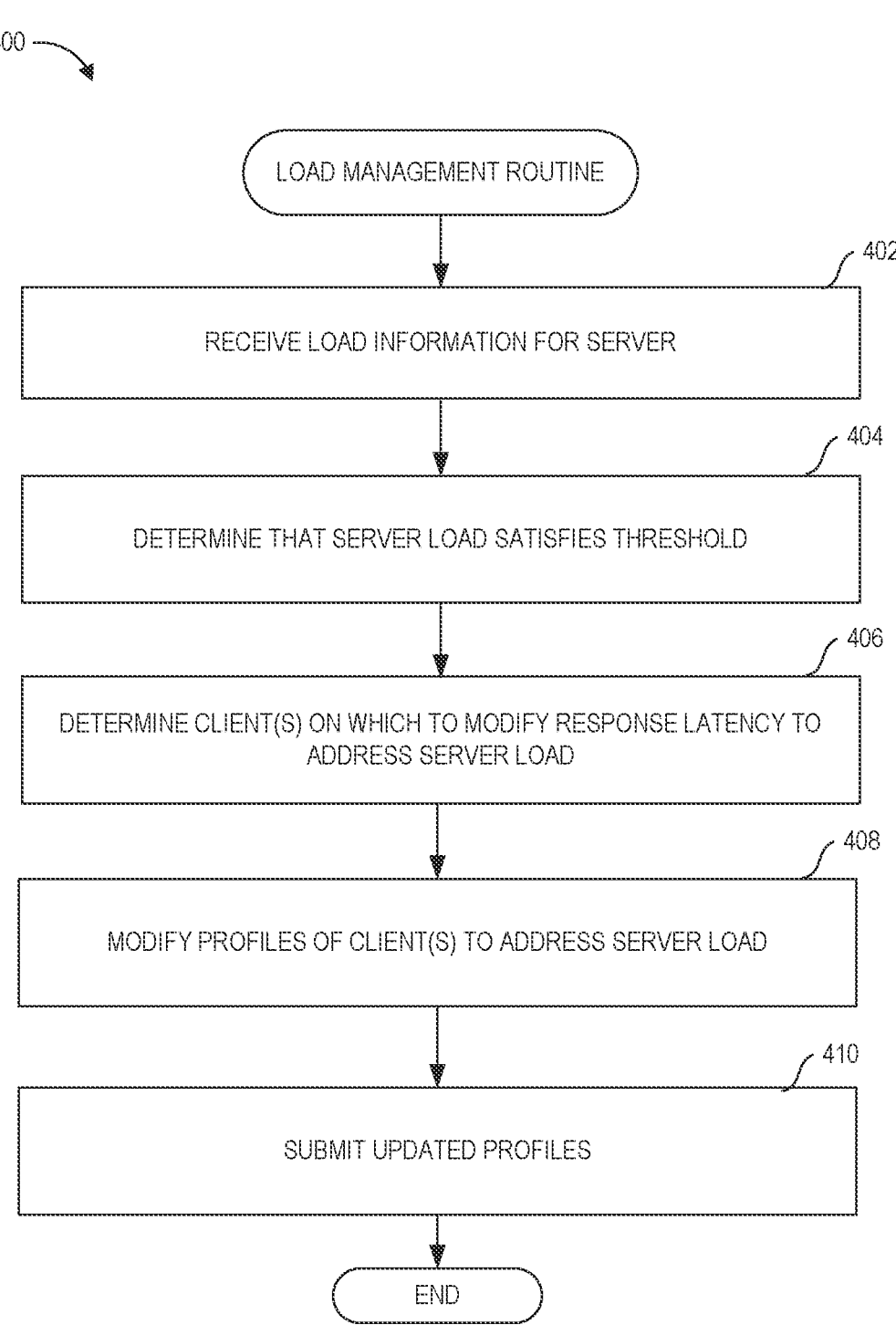
FIG. 4 depicts an illustrative routine use of dynamic latency shaping to control server load.

With reference to FIG. 4, an illustrative routine 400 is depicted for use of dynamic latency shaping to control server load. The routine 400 may be implemented for example by the performance monitoring system 150 of FIG. 1. For example, the routine 400 may be used to respond to overloading of one or more volume hosts 142 by increasing the synthetic latency added to I/O operations handled by the volume host 142.

The routine 400 begins at block 402, where the performance monitoring system 150 receives load information regarding one or more servers, such as volume hosts 142. As discussed above, the load information may be received from the servers or from clients of the servers (e.g., host devices 132). The load information can include both direct measurements of load on the servers, such as resource utilization of the servers, and indirect measurements of load, such as information regarding requests submitted to the servers by clients. In the context of latency shaping for block storage devices, the information may include, for example, metadata or aggregate statistical information regarding I/O operations submitted to the server, such as measures of IOPS or data throughput handled at the server, block sizes of operations, sources of the operations (e.g., per client) or other information.

At block 404, the performance monitoring system 150 determines from the obtained load information that load on an individual server satisfies a threshold value. For example, the performance monitoring system 150 may determine that utilization of a volume is currently at 71% utilization according to a given metric or dimension of load, and that such use satisfies a given threshold (e.g., 70%). As discussed above, load may be measured in any variety of metrics (e.g., write IOPS, read IOPS, write throughput, read throughput, etc. in the case of block storage operations). Thus, the performance monitoring system 150 can illustratively determine that a server is sufficiently loaded to satisfy the threshold according to any number of such metrics. While the routine 400 is described with respect to a single server, the routine 400 in some instances may occur with respect to loading across multiple servers. In such an example, the remaining operations of the routine 400 may illustratively be completed with respect to each server that satisfies a threshold. Moreover, as noted above, the performance monitoring system 150 may in some instances maintain multiple thresholds associated with different modifications to latency for requests at the server (which modifications are discussed in more detail below). For example, thresholds may be set for increasingly high levels of use that correspond to increasingly high additions of latency to request at the server. Conversely, thresholds may be set for increasingly low thresholds of use that correspond to increasing reductions of latency for such requests. In some instances, each threshold is bi-directional, such that crossing the threshold in one direction results in addition of latency to requests and such that cross the threshold in the other direction results in removal of latency. In another example, instances are uni-directional, such that crossing the threshold in one direction results in addition of latency without addition of latency when the threshold is crossed in the opposite direction.

At block 406, the performance monitoring system 150 identifies clients on which to modify latency to address the server load. For example, the performance monitoring system 150 may attribute load on the server to individual clients (e.g., directly or by correspondence between clients and load used to service requests to individual objects on the server, such as block storage volumes 144) and select a subset of clients based at least partly on the load. Illustratively, to counteract overloading, the performance monitoring system 150 may determine a set of the top clients in terms of resource usage, such as a top absolute number of clients, a top percentage of clients, or top clients associated with requests that collectively use a given percentage of resources of the server. For example, in the case of a volume host 142 hosting block storage volumes 144 that is overloaded in a given dimension (e.g., write IOPS), the performance monitoring system 150 may identify a set of clients (e.g., corresponding to individual volumes 144) that utilize n % of the expected total write IOPS capacity of the volume host 142.

While resource usage is discussed herein as one factor, other factors may be used to select clients. For example, individual clients may be associated with more stringent performance expectations, such that they are less likely to be selected for increases in latency, more likely to be selected for decreases in latency, or both. While the routine 400 is depicted in FIG. 4 as including selection of individual clients, in some variations the performance monitoring system 150 modifies the latency on all clients of a server uniformly and block 404 may therefore be omitted.

At block 408, the performance monitoring system 150 modifies the latency associated with requests from the identified clients in accordance with the satisfied load threshold. Specifically, in accordance with embodiments of the present disclosure, each client may be associated with a performance profile that indicates latency for operations corresponding to the profile (e.g., for I/O operations submitted to a volume 144 by the client). As discussed above, the modification may be targeted according to the threshold satisfied. For example, where the load threshold indicates overloading, the performance monitoring system 150 can increase the latency of requests for the clients. Conversely, where the load threshold indicates underloading or a reduction in overloading, the performance monitoring system 150 can decrease the latency of requests. As discussed above, modification of latency can include modifying the synthetic latency that is added to operations of the clients, via the techniques described herein and in the Prior Filings. Moreover, the type of such modification may be based at least partly on the threshold satisfied. For example, where load satisfies a threshold only in a given dimension (e.g., write IOPS), modifications may target that load in that dimension by modifying operations expected to drive load in that dimension (e.g., write operations with a block size under a threshold value). Additionally or alternatively, the magnitude of such modification may be based at least partly on the threshold satisfied. For example, consecutively higher overloading thresholds may be associated with consecutively higher latency additions, in attempt to counteract load on the server. Thus, the performance monitoring system 150 can target latency modifications to the individual clients, individual operations, or both, such that the targeted latency modifications are expected to modify server load in the desired manner.

At block 410, the performance monitoring system 150 submits the updated performance profiles to devices configured to implement the profiles. For example, where host devices 132 implement profiles by injecting synthetic latency into I/O operations, the performance monitoring system 150 can submit the profiles to the host devices 132. Additionally or alternatively, profiles may be sent to other destinations, such as to volume hosts 142 when such hosts 142 are configured to implement the profiles. As described above, these components may then use the updated profiles to shape latency of operations by the clients.

While the routine 400 enables the performance monitoring system 150 to complete the steps in the routine, in some instances, these steps may be implemented by other actors. For example, the cloud provider network 120 may implement the routine 400 using other computer systems and/or components (e.g., the block storage service 140). Thus, the routine 400 may reflect only a portion of operation of the cloud provider network 120.

Figure 5:
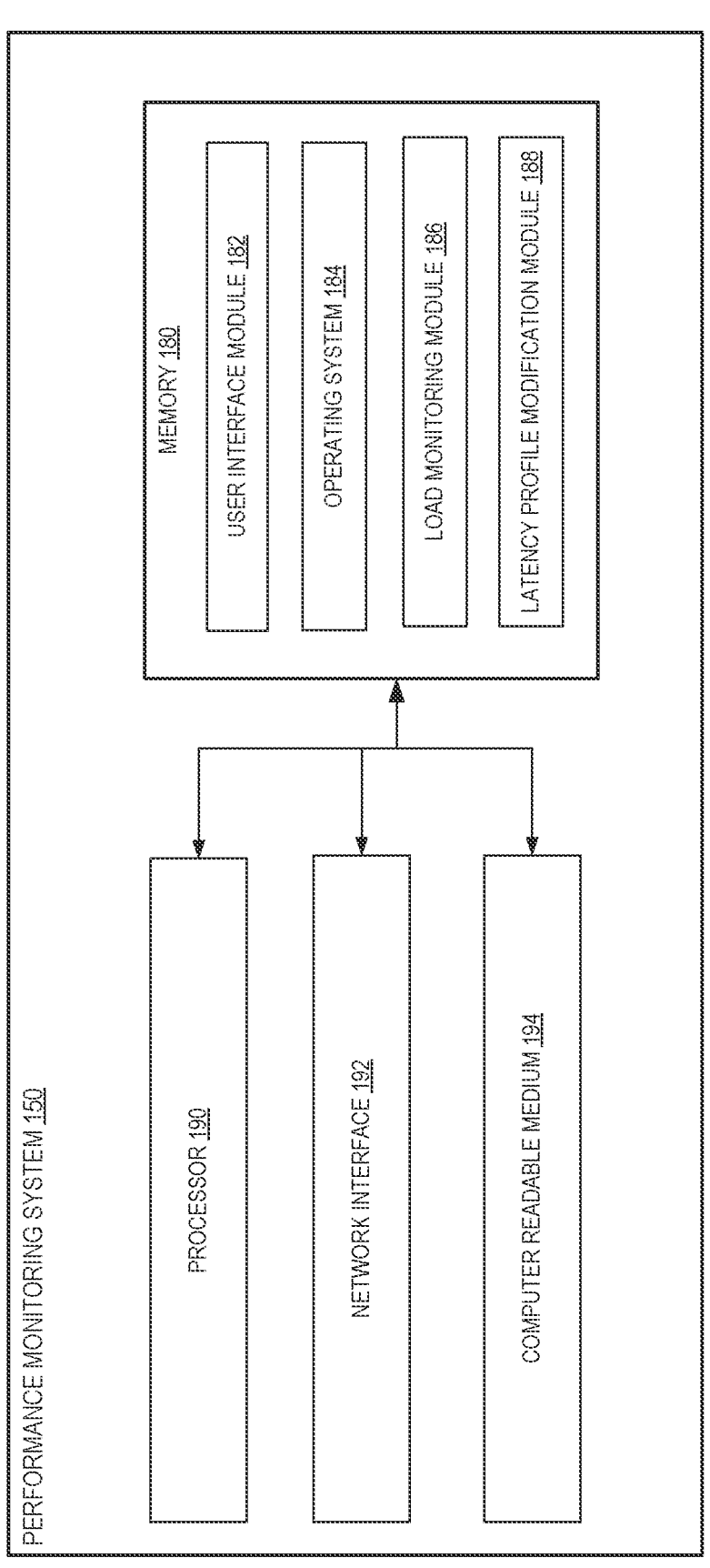
FIG. 5 depicts an example architecture of a computing that can be used to perform one or more of the techniques described herein.

FIG. 5 depicts an example architecture of a computing system (referred to as the performance monitoring system 150) that can be used to perform one or more of the techniques described herein or illustrated in FIGS. 1-4. The general architecture of the performance monitoring system 150 depicted in FIG. 5 includes an arrangement of computer hardware and software modules that may be used to implement one or more aspects of the present disclosure. The performance monitoring system 150 may include many more (or fewer) elements than those shown in FIG. 5. It is not necessary, however, that all of these elements be shown in order to provide an enabling disclosure. As illustrated, the performance monitoring system 150 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 (e.g., a hypervisor) that provides computer program instructions for use by the processor 190 in the general administration and operation of the cloud provider network 120. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 includes a load monitoring module 186 and a latency profile modification module 188. In one embodiment, the load monitoring module 186 and the latency profile modification module 188 represent code that, when executed, implement various aspects of the present disclosure. For example, the load monitoring module 186 when executed may cause the performance monitoring system 150 to monitor load on servers, such as volume hosts 142, and determine if the satisfies a load threshold. In accordance with embodiments of the present disclosure, the latency profile modification module 188 when executed may cause the performance monitoring system 150 modify latency profiles associated with the clients of the server in order to modify the load according to the satisfied profile, such as by increasing latency to counteract overloading. The load monitoring module 186 and the latency profile modification module 188 may thus shape of latency of operations obtained at a server to control load on that server, and/or other implement aspects discussed herein or illustrated in FIGS. 1-4.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for managing server load in a cloud provider environment, the system comprising:

a storage host hosting block storage volumes, wherein individual block storage volumes act as virtual storage for corresponding virtual machine instances;

a compute host hosting a particular virtual machine instance of the corresponding virtual machine instances for which a particular volume acts as virtual storage, wherein the compute host is in communication with the storage host via a network and facilitates submission of input/output (I/O) operations to the particular block storage volume by the particular virtual machine instance, and wherein the compute host is configured to selectively add synthetic latency to the I/O operations according to a performance profile associated with the particular virtual machine instance; and a performance monitoring system, wherein the performance monitoring system is configured to:

receive load information for the storage host reflecting aggregate I/O operations to the block storage volumes by the corresponding virtual machine instances;

determine that the load information satisfies a load threshold with respect to at least one load dimension of the aggregate I/O operations;

select the particular virtual machine instance on which to modify the performance profile to increase a latency of at least a subset of the I/O operations of the particular virtual machine instance;

modify the performance profile of the particular virtual machine instance by indicating an increase to a target latency of the subset of I/O operations, and wherein the subset of I/O operations is selected to reduce load of the storage host in the at least one load dimension; and send the modified performance profiles to the compute host;

wherein the compute host uses the modified performance profile to add the target latency to the subset of the I/O operations.

2. The system of claim 1, wherein the load dimension is at least one of read operations, write operations, throughput of the network, or input/output operations per second (IOPS) of the storage host.

3. The system of claim 1, further comprising:

receive second load information for the storage host reflecting aggregate I/O operations to the block storage volumes by the corresponding virtual machine instances;

determine that the second load information does not satisfy the load threshold with respect to at least one load dimension of the aggregate I/O operations; and revert the performance profile of the particular virtual machine instance to remove modification of the latency of the subset of I/O operations, wherein the compute host uses the reverted performance profile to reduce the target latency to the subset of the I/O operations.

4. The system of claim 1, wherein the corresponding virtual machine instances are selected based on resource usage of the corresponding virtual machine instances on the storage host.

5. The system of claim 1, wherein modifying the performance profile of the particular virtual machine instance corresponds to modifying the performance profile of one or more of the block storage volumes that correspond to the particular virtual machine instance.

6. A method implemented at a performance monitoring system in communication with a storage host that hosts block storage volumes, wherein the storage host is in communication with a compute host hosting a particular compute instance of compute instances, and wherein the compute host facilitates submission of input/output (I/O) operations to the block storage volumes by the particular compute instance, the method comprising:

receiving load information for the storage host;

determining that the load information satisfies a load threshold;

selecting the particular compute instance on which to modify a performance profile to modify a latency of at least a subset of the I/O operations of the one or more of the compute instances;

modifying the performance profile of the particular compute instance to modify the latency of the subset of I/O operations, and wherein the subset of I/O operations is selected to modify load of the storage host according to the load threshold; and sending the modified performance profile to the storage host, wherein the storage host upon receiving the modified performance profile selectively adds synthetic latency to the subset of I/O operations according to the modified performance profile.

7. The method of claim 6, wherein the load threshold correspond to at least one load dimension, and wherein the performance profile is modified based at least in part on the at least one load dimension.

8. The method of claim 6, wherein the load threshold corresponds to a type of I/O operations, and wherein the subset of I/O operations include I/O operations of the type.

9. The method of claim 6, wherein the load threshold corresponds to a sequence of load thresholds associated with different magnitudes of load, and wherein a magnitude of modification to the latency is selected according to the load threshold.

10. The method of claim 6, wherein the load threshold is associated with an amount of I/O operations per second (IOPS), and wherein the subset of I/O operations corresponds to I/O operations on blocks under a threshold block size.

11. The method of claim 6, wherein the load threshold is associated with an amount of throughput, and wherein the subset of I/O operations corresponds to I/O operations on blocks greater than a threshold block size.

12. The method of claim 6, wherein modification of the latency is at least one of an increase or a decrease in the latency.

13. One or more non-transitory computer-readable media comprising instructions executable by a performance monitoring system in communication with a storage host hosting block storage volumes, wherein the storage host is in communication with a compute host hosting a particular compute instance of compute instances, and wherein the compute host facilitates submission of input/output (I/O) operations to the block storage volumes by the particular compute instance, and wherein the instructions, when executed, cause the performance monitoring system to:

receive load information for the storage host;

determine that the load information satisfies a load threshold;

select the particular compute instance on which to modify a performance profile to modify a latency of at least a subset of the I/O operations of the particular compute instance;

modify the performance profile of the particular compute instance to modify the latency of the subset of I/O operations, and wherein the subset of I/O operations is selected to modify load of the storage host according to the load threshold; and send the modified performance profile to at least one device of the compute host or the storage host, wherein the at least one device is configured to selectively add synthetic latency to the subset of I/O operations according to the modified performance profile.

14. The one or more non-transitory computer-readable media of claim 13, wherein modification of the latency is an increase in the latency, and wherein the instructions further cause the performance monitoring system to:

receive second load information for the storage host;

determine that the second load information does not satisfy the load threshold; and revert the performance profile of the particular compute instance to remove modification of the latency of the subset of I/O operations.

15. The one or more non-transitory computer-readable media of claim 13, wherein modifying the performance profile of the particular compute instance to modify the latency of the subset of I/O operations comprises modifying the performance profile of the particular compute instance to modify the latency of all I/O operations.

16. The one or more non-transitory computer-readable media of claim 13, wherein selecting the particular compute instance comprises selecting all of the compute instances.

17. The one or more non-transitory computer-readable media of claim 13, wherein the particular compute instance is selected based on resource usage of the particular compute instance on the storage host.

18. The one or more non-transitory computer-readable media of claim 13, wherein the at least one device is configured to selectively add synthetic latency by application of a proportional-derivative-integral (PID) algorithm.

19. The one or more non-transitory computer-readable media of claim 13, wherein the performance profile includes a target distribution of I/O operation latencies.

20. The one or more non-transitory computer-readable media of claim 13, wherein the instructions, when executed, further cause the performance monitoring system to migrate at least one of the block storage volumes away from the storage host.

* * * * *